(12) United States Patent
Lahey et al.

(10) Patent No.: US 9,039,049 B2
(45) Date of Patent: May 26, 2015

(54) MOUNTING BRACKET FOR LINK ATTACHMENT

(71) Applicant: Lahey & Sharpe Enterprises and Investments Inc., Madoc (CA)

(72) Inventors: Thomas James Lahey, Madoc (CA); Steven Sharpe, Foxboro (CA)

(73) Assignee: LAHEY & SHARPE ENTERPRISES AND INVESTMENTS INC., Madoc, Ontario (CA)

( * ) Notice: Subject to any disclaimer, the term of this patent is extended or adjusted under 35 U.S.C. 154(b) by 1 day.

(21) Appl. No.: 13/803,914

(22) Filed: Mar. 14, 2013

(65) Prior Publication Data

US 2013/0240692 A1    Sep. 19, 2013

Related U.S. Application Data

(60) Provisional application No. 61/610,535, filed on Mar. 14, 2012.

(51) Int. Cl.
| | |
|---|---|
| *E05C 17/36* | (2006.01) |
| *F16M 13/02* | (2006.01) |
| *F16G 15/04* | (2006.01) |
| *E05B 83/12* | (2014.01) |

(52) U.S. Cl.
CPC .............. *E05C 17/365* (2013.01); *F16M 13/02* (2013.01); *F16G 15/04* (2013.01); *E05B 83/12* (2013.01); *E05C 17/36* (2013.01)

(58) Field of Classification Search
CPC ...... E05C 17/365; E05C 17/36; F16M 13/02; F16G 15/04; E05B 83/12

USPC .......... 248/205.1, 220.21, 220.22; 24/116 R, 24/116 A; 292/264; 294/82.1, 82.17
See application file for complete search history.

(56) References Cited

U.S. PATENT DOCUMENTS

| | | | |
|---|---|---|---|
| 2,908,529 A | 10/1959 | Davidson | |
| 3,720,431 A * | 3/1973 | Oliver et al. | 292/264 |
| 3,809,418 A * | 5/1974 | Canfield | 292/264 |
| 3,844,591 A | 10/1974 | Velcover | |
| 4,269,439 A | 5/1981 | Warwick et al. | |
| 4,889,372 A * | 12/1989 | Dege et al. | 292/218 |
| 5,273,326 A | 12/1993 | Kinkaide | |
| 5,462,319 A * | 10/1995 | Roden, Jr. | 292/264 |
| 5,551,739 A * | 9/1996 | Solis | 292/264 |
| 5,716,084 A * | 2/1998 | Sanford et al. | 292/264 |
| 6,478,348 B2 | 11/2002 | Lahey | |
| 7,503,102 B2 * | 3/2009 | Hsieh | 24/116 R |
| 8,196,976 B2 * | 6/2012 | Womack | 292/264 |
| 8,465,063 B1 * | 6/2013 | Jones et al. | 292/264 |
| 2002/0089191 A1 * | 7/2002 | Lahey | 292/264 |
| 2009/0033106 A1 | 2/2009 | West | |

* cited by examiner

*Primary Examiner* — Todd M Epps
(74) *Attorney, Agent, or Firm* — Miltons IP/p.i.

(57) ABSTRACT

A bracket is provided for anchoring a flexible member such as a chain to a surface in such a way as to allow such member to be repositioned over a range of locations along the bracket, once the bracket has been fastened to the surface. The bracket includes an elongated slot along which the terminal end of the flexible member may slide, thereby permitting the anchoring end of the flexible member to be positioned over a range of positions along the bracket.

20 Claims, 13 Drawing Sheets

MOUNTING BRACKET FOR LINK ATTACHMENT

TECHNICAL FIELD

The present disclosure relates to a holdback device for holding a door or gate in an open or closed position. More particularly, the present disclosure relates to a mounting bracket used in conjunction with a flexible member for holding doors of a highway cargo trailer in an open position.

BACKGROUND

Highway trailers of conventional design are generally provided with hinged doors at the rear of the trailer which are pivotally mounted to be swung open and allow the doors to lie along the sides of the trailer. The doors are then fastened along the side of the trailer to allow the trailer to be maneuvered up to a loading dock or otherwise positioned for unloading.

It is important under these circumstances that the doors be held as tightly as possible against the side of the trailer. If a door protrudes unduly, it may catch on structures adjacent to the loading dock. In the past doors have been secured by providing a link from the door extending to a hook or other latch secured to the sidewall of the trailer. The link is typically in the form of a length of chain. Such chains are commonly anchored at one end by being fastened to the door by door hardware. The other end, the free end, is then attached to the hook on the trailer side.

It is desirable that the receiving hook be positioned on the side of the trailer at the same height as the location of the anchor point on the trailer door. This provides the chain with the shortest path in extending between the anchor point and the hook. This in turn holds the open door as closely as is practical to the side of the trailer.

The hook itself may be mounted at various heights along the side of the trailer, depending on the stability of the trailer wall. For example, a floor beam or vertical wall beam on the trailer side wall is the preferred site for attaching the receiving hook. However, at the anchor end (i.e. on the door), conventional mounting brackets generally restrict the chain anchor point to a single position. That anchor point may not be compatible with providing the chain with the shortest path when extending between the anchor point and the hook.

U.S. Pat. No. 6,478,348 discloses a hook with a security feature for receiving a chain used to hold the door of a highway trailer open. A plate member is affixed to a support, adjacent the vertical side edge of the door in either the open or closed position. The plate is provided with a receiving hook and a pivotally mounted bail intermediate the ends thereof. The chain is secured to the vertical side edge of the door and is passed upwardly through the bail and the end is slipped over the end of the finger member, which is then allowed to fall back to its rest position and thereby secures the door in the selected open or closed position.

U.S. Pat. No. 5,273,326 discloses a door hold back device with a link having spherical end portions is connectable between a socket provided in a mounting plate on the vehicle wall and a socket provided in a receiver on the cargo door.

U.S. Pat. No. 4,269,439 discloses a door holdback device that may be mounted on the wall of a highway trailer and is automatically retractable to an inoperative position. The device has a primary wire loop extending from the wall that is integrally attached to two secondary wire loops, which are then secured to the interior of the wall. The secondary wire loops are internally stressed to retract the primary loop when not in use.

U.S. Publication No. 20090033106 discloses a door holdback device (or bracket) that is mounted on a supporting surface. The device includes housing and an enclosed post that extends upward from a base. The housing has an opening which allows a loop on a rope to be installed over the post by inserting the loop through the opening.

There is a need for a mounting system for a chain bracket that improves the prospects for mounting the hook and chain anchor at optimal locations on the trailer body. In particular, it would be desirable to provide a bracket mounting system minimizing the chain length employed to secure the doors in an open position.

While this device will be described with particular reference to transport vehicles, such as semi-trailer or truck body doors, it will be appreciated by those skilled in the art that such a device finds application at other locations, where door and gate holdbacks or latches are used to secure swing-able gates or doors in an open or closed position.

The device in its general form will first be described, and then its implementation in terms of specific embodiments will be detailed with reference to the drawings following hereafter. These embodiments are intended to demonstrate the principles of the device, and the manner of its implementation. The device in its broadest and more specific forms will then be further described, and defined, in each of the individual claims which conclude this specification.

SUMMARY

In one aspect, there is provided a bracket comprising: a) a plurality of apertures for fastening the bracket to a surface; b) an elongated slot; c) a riding member adjacent the elongated slot; d) a bracket opening, which communicates with the elongated slot; and e) a key member for receiving a flexible member, the key member in communication with the riding member, wherein the flexible member attaches to the riding member; moves freely along a length of the riding member; and cannot access the bracket opening once the bracket is fastened to the surface.

In another aspect, there is provided a bracket comprising: a) a plurality of apertures for fastening the bracket to a surface; b) an elongated slot with an adjacent riding member; and c) a bracket opening for receiving a flexible member, the bracket opening in communication with the elongated slot; wherein a portion of the flexible member is slidingly anchored to the bracket and moves freely along a length of the elongated slot.

In yet another aspect, there is provided a bracket for attachment to, or formation of, a cam-lock bushing plate, the bracket comprising: a) a plurality of apertures for fastening the bracket to the cam-lock bushing plate; b) an elongated slot; and c) a riding member adjacent the elongated slot; wherein the elongated slot and the riding member form part of a flange that is bent out of a plane containing the apertures.

In all of the above variants, there is provided a bracket for anchoring a flexible member in such a way as to allow the flexible member to be repositioned over a range of locations along the bracket once the bracket has been fastened to a surface. This is accomplished by either having the flexible member slidingly attached to the riding member of the bracket or slidingly engaged with the elongated slot of the bracket. When the flexible member is slidingly attached to the riding member, the flexible member cannot access the bracket opening once the bracket is fastened to the surface. In the case where the flexible member slidingly engages with the elongated slot, the flexible member may or may not access the bracket opening once the bracket is fastened to the surface, depending on whether or not there is a constraining surface beneath the bracket opening.

In all variants, the bracket can be mounted in a manner so that the flexible member can have a range of vertical positions along the length of the bracket. Alternatively, the bracket can be mounted in a manner so that the flexible member can have a range of horizontal positions on the bracket.

The bracket can be used for mounting onto a semi-trailer. In this application, the bracket can be mounted either onto the door, or onto the side of the trailer. Furthermore, the riding member may be bent out of the plane of the apertures, so as to form a flange, prior to mounting the bracket onto the semi-trailer. The flange itself may have a slight bend to provide additional stability. Alternatively, the bracket may be flat, and attached to the trailer surface using spacers, so that there is a space between the riding member and the trailer surface thereby allowing the flexible member to slide freely along the riding member.

Where the bracket forms part of a cam-lock bushing plate, the riding member is bent out of the plane of the apertures in order to form a flange.

In addition, the bracket can be mounted onto many types of trucks that are equipped with swing doors. This includes, for example, most non-articulating trucks equipped with cargo boxes/bodies, which can be equipped with swing doors as well. As in the case of the semi-trailer, the bracket may be bent so as to have a flange, or may remain flat and attached to the door surface with spacers.

The bracket can also be used for mounting onto a gate assembly. In this application, the bracket can be mounted either onto a gate post, or onto a gate. If the elongation slot and riding member extend beyond the surface and do not abut a surface of the gate assembly, then the bracket can remain planar. However, if the entire bracket abuts the surface, then the bracket may be attached to the gate assembly surface using spacers, so that there is a space between the riding member and the gate assembly surface thereby allowing the flexible member to slide freely along the riding member. Alternatively, the bracket can be shaped so that the riding member may be bent out of the plane that contains the key member and apertures.

The flexible member can be one link, or a series of links forming a chain. Alternatively, the flexible member can include a clevis, a quick link, or similar type of intermediate attachment device between the bracket and the chain link.

The number of apertures can vary, so as to provide adequate attachment to a surface. In addition, one or more of the apertures can be elongated, in order to provide a range of attachment options to the surface.

The foregoing summarizes the principal features of the bracket and some of its optional aspects. The bracket may be further understood by the description of the preferred embodiments, in conjunction with the drawings, which now follow.

DESCRIPTION OF PREFERRED EMBODIMENTS

Figure 1:
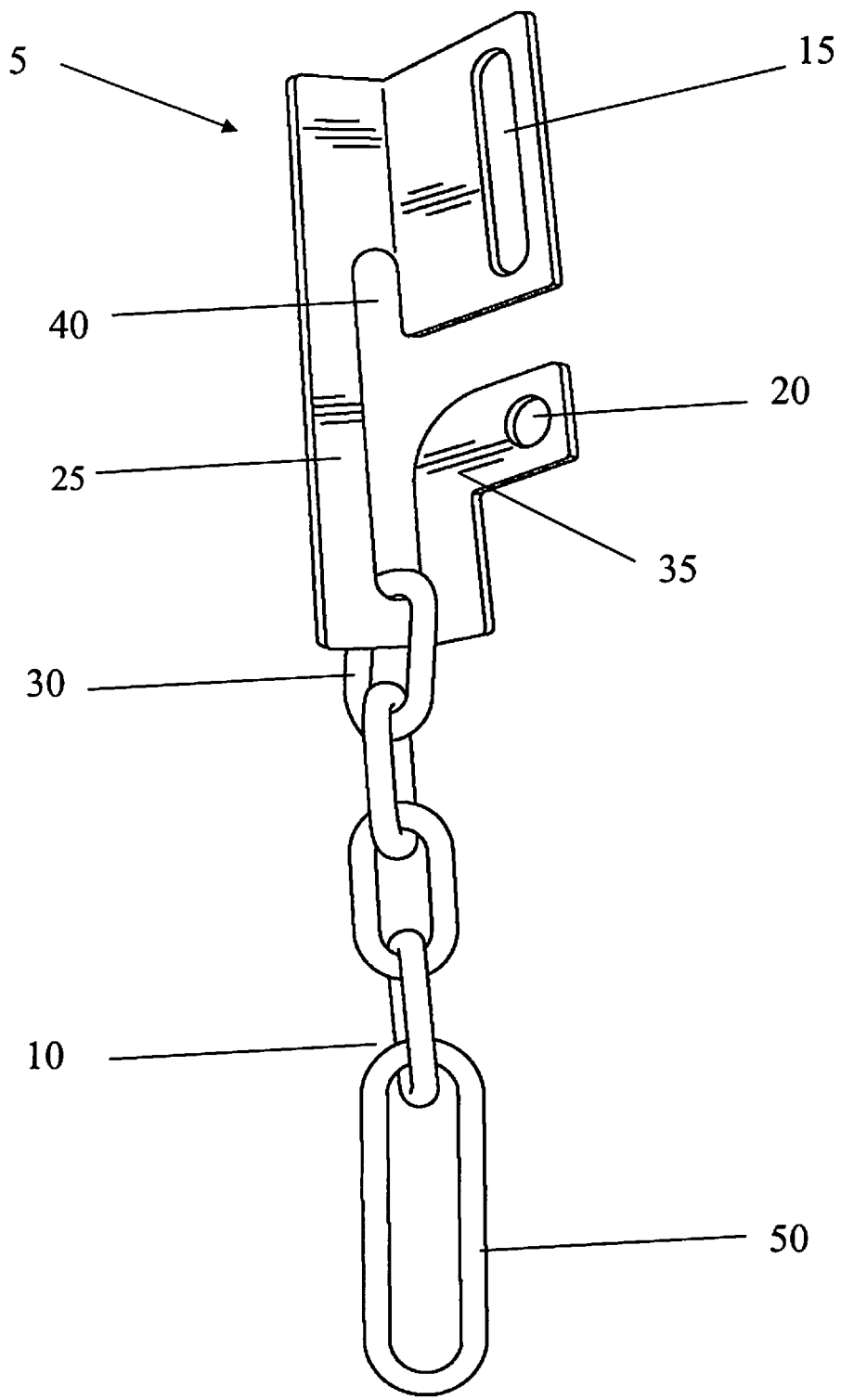
FIG. 1 shows an embodiment of a bracket with a flexible member attached thereto.

FIG. 1 shows an embodiment of a bracket (5) with a chain link (10) attached thereto. The bracket contains two apertures (15, 20). One aperture (15) is elongated, to accommodate the mounting bolts of a trailer cam-lock bushing plate. Alternatively, the bracket (5) can be attached directly to the trailer door, if required. In addition, this embodiment can also be used for a gate assembly. The riding member (25) of the bracket (5) is bent out of the plane that contains the apertures (15, 20).

Before the bracket (5) is mounted onto a surface, the anchoring link (30) of the chain link (10) slides over the key member (35) of the bracket (5). In FIG. 1, the anchoring link (30) is sitting at the base of the elongated slot (40). However, the chain link (10) can be moved (by hand) upwards, along the riding member (25), to a desired height. The distal end (50) of the chain link (10) can then be attached to another body (e.g. hook on side of a trailer, part of a gate assembly, etc.).

The bracket (5) is universal, in that it can be attached in the orientation as shown, or rotated 180 degrees in the plane containing the key member (35) and bracket (5), and then attached. Where the application is for a semi-trailer, the bracket (5) is attached in the orientation as shown to a right door, while the 180 degree-rotated orientation (such that the key member (35) is positioned at the top of the bracket (5)) may be attached to a left door. Alternatively, a mirror image of the bracket (5) can be constructed, in which the key member (35) is positioned at the bottom of the bracket (5), for attachment to a left door. The latter form of attachment, in which the key member (35) is positioned at the bottom of the bracket (5), provides for improved lower positioning of the flexible member. In addition, the bracket (5) can be attached to most pre-existing cam-lock bushing plates (e.g. cam-lock bushing plate (500) shown in FIG. 10).

The remaining figures illustrate various embodiments of the bracket.

Figure 2:
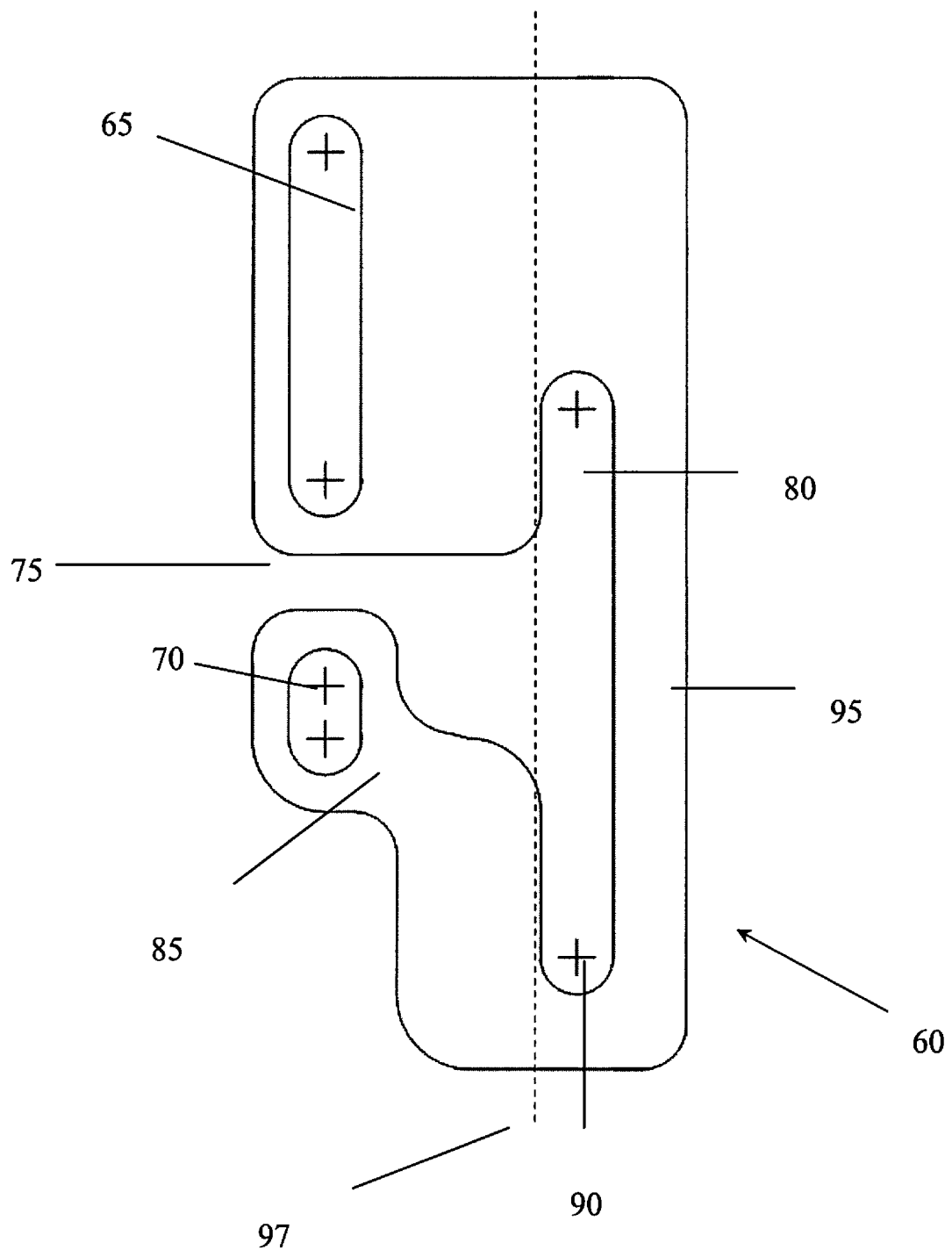
FIGS. 2 and 2A illustrate respectively a planar view and a perspective view of a second embodiment of a bracket.

In FIG. 2, the bracket (60) contains two apertures (65, 70), one more elongated (65) than the other (70). The variations in elongation allow for attachment of the bracket (60) to a variety of pre-existing cam-lock bushing plates. However, it is understood that this embodiment can be used for a gate assembly, or for attachment to the side of a trailer (rather than the door). The bracket opening (75) communicates with the elongated slot (80). The central opening of a flexible member (not shown) slides through the key member (85), to the base (90) of the elongated slot (80), and can then slide freely along the riding member (95), provided there is no constraining surface beneath the elongated slot (80). Alternatively, the bracket (60) can be fastened via a spacer between the surface and the plane containing the apertures (65,70), so that there is no constraining surface beneath the elongated slot (80). Or, instead of using a spacer, the bracket (60) may be optionally bent along the line (97), in order to form a flange having riding member (95), for attachment of the bracket to a semi-trailer.

The bracket (60) is universal, in that it can be attached in the orientation as shown or rotated 180 degrees in the plane containing the key member (85) and base (90), such that the key member (85) is positioned at the top of the bracket (60), and then attached. Alternatively, it can be flipped over (so that the key member (85) is positioned at the bottom of the bracket (60)) and then attached. The latter form of attachment, in which the key member (85) is positioned at the bottom of the bracket (60), provides for improved lower positioning of the flexible member.

Where the application is for a semi-trailer, the bracket (60) is attached in the orientation as shown to a left door, while the 180 degree-rotated orientation or the flipped orientation is attached to a right door. In addition, the bracket (60), with the riding member bent along line (97), can be attached to most pre-existing cam-lock bushing plates (e.g. cam-lock bushing plate (500) shown in FIG. 10). A mirror image of the bracket (60), in which the riding member is bent out of the plane along line (97) and the key member (85) remains positioned at the bottom of the bracket (60), may be attached to the right door.

Figure 2A:
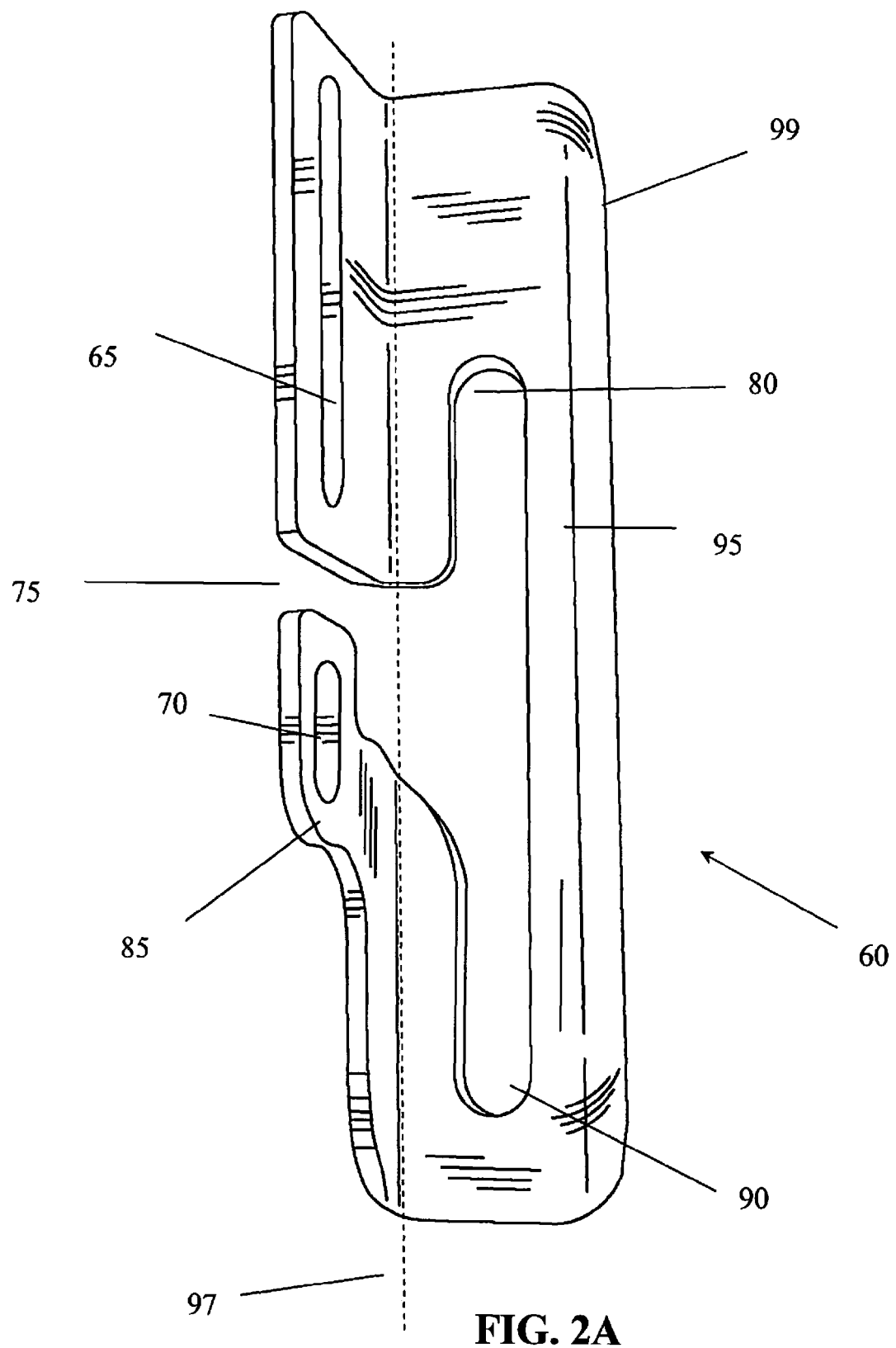

FIG. 2A illustrates a perspective view of the embodiment shown in FIG. 2, where the bracket is bent along line (97) so that the riding member (95) forms part of a flange. FIG. 2A also illustrates an optional bend (99) in the riding member (95) that provides additional stability. This optional bend may be applied to the illustrated embodiments in particular, and to the bracket in general.

Figure 3:
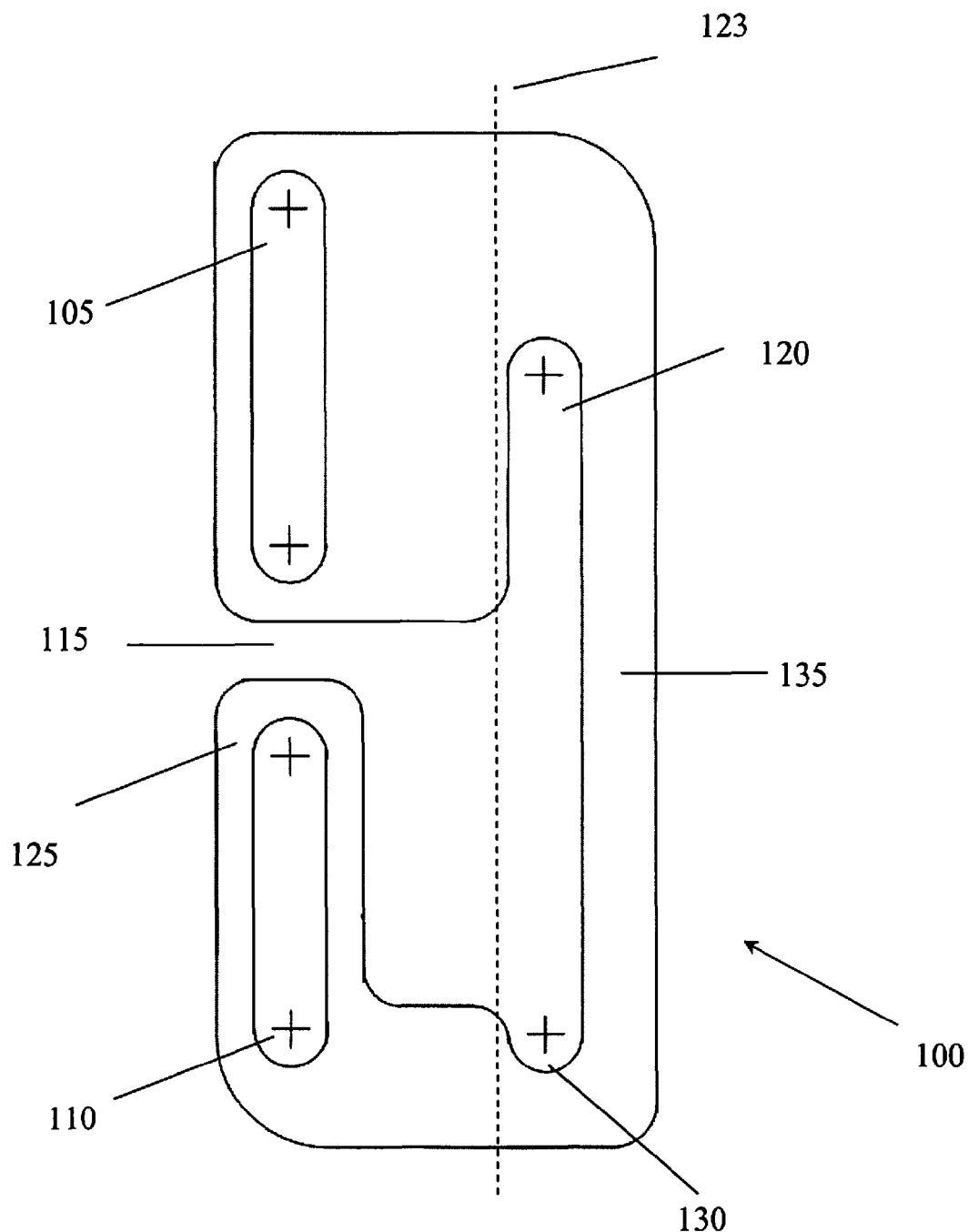
FIG. 3 illustrates a planar view of a third embodiment of a bracket.

FIG. 3 illustrates a modified version of the embodiment shown in FIG. 2. In FIG. 3, the bracket (100) contains two elongated apertures (105, 110). The variations in elongation allow for attachment of the bracket (100) to a variety of pre-existing cam-lock bushing plates. However, it is understood that this embodiment can be used for a gate assembly, or for attachment to the side of a trailer (rather than the door). The bracket opening (115) communicates with the elongated slot (120). The central opening of a flexible member (not shown) slides over the key member (125), to the base (130) of the elongated slot (120), and can then slide freely along the riding member (135), provided there is no constraining surface beneath the elongated slot (120). Alternatively, the bracket (100) can be fastened to a surface with a spacer between the surface and the plane containing the apertures (105, 110), so that there is no constraining surface beneath the elongated slot (120). Or, instead of using a spacer, the bracket (100) may be optionally bent along the line (123), in order to form a flange having riding member (135), for attachment of the bracket to a semi-trailer.

As in the embodiment shown in FIG. 2, the bracket (100) can be rotated 180 agrees in a plane containing the key member (125) and base (130), such that the key member (125) is positioned at the top of the bracket (100) and applied to a surface. Alternatively, a mirror image of the bracket (100) may be constructed such that the key member (125) is positioned at the bottom of the bracket (100)) and then attached. The latter form of attachment, in which the key member (125) is positioned at the bottom of the bracket (100), provides for improved lower positioning of the flexible member.

The bracket (100) allows for increased mounting locations, but may not be compatible with all lower cam-lock hardware. For example, bracket (100) may not be compatible with the prior art raised cam-lock bushing plate hardware (500) shown in FIG. 10.

Figure 4:
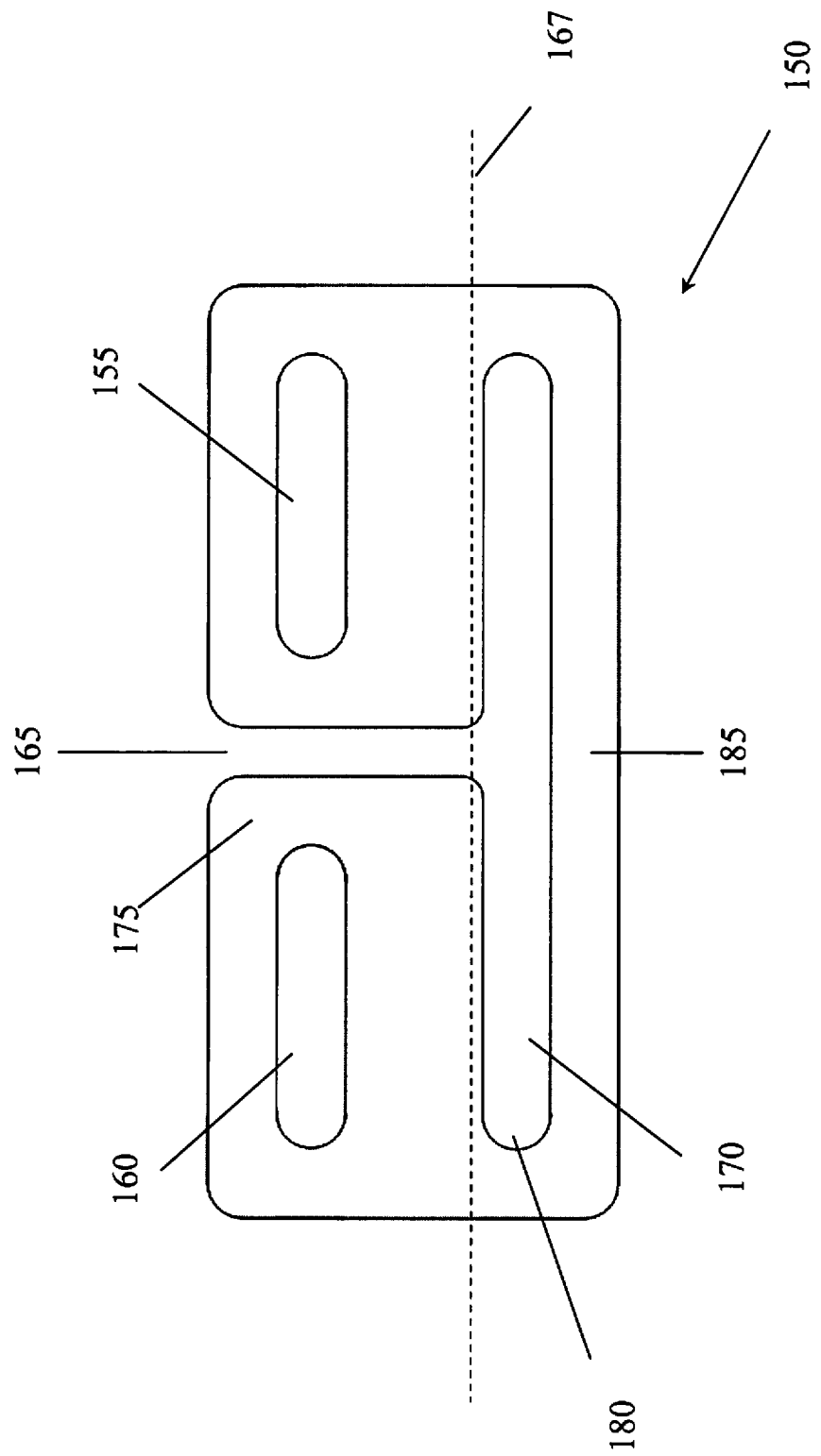
FIG. 4 illustrates a planar view of a fourth embodiment of a bracket.

FIG. 4 illustrates another embodiment of a bracket (150). In FIG. 4, the bracket (150) contains two apertures (155, 160), each of which have the same elongation. The variations in elongation allow for attachment of the bracket (150) to a variety of pre-existing cam-locks. However, it is understood that this embodiment can be used for a gate assembly, or for attachment to the side of a trailer (rather than the door). The bracket opening (165) communicates with the elongated slot (170). The central opening of a flexible member (not shown) slides over the key member (175), to the base (180) of the elongated slot (170), and can then slide freely along the riding member (185), provided there is no constraining surface beneath the elongated slot (170). Alternatively, the bracket (150) can be fastened to a surface with a spacer between the surface and the plane containing the apertures (155, 160), so that there is no constraining surface beneath the elongated slot (170). Or, instead of using a spacer, the bracket (150) may be optionally bent along the line (167), in order to form a flange having riding member (185), for attachment of the bracket to a trailer.

As in the embodiment shown in FIG. 2, the bracket (150) can be rotated 180 agrees, and applied to a surface. Alternatively, a mirror image of the bracket (150) can also be used, such that the key member (175) is positioned at the bottom of the bracket (150)) and then attached. The latter form of attachment, in which the key member (175) is positioned at the bottom of the bracket (150), provides for improved lower positioning of the flexible member.

Figure 5:
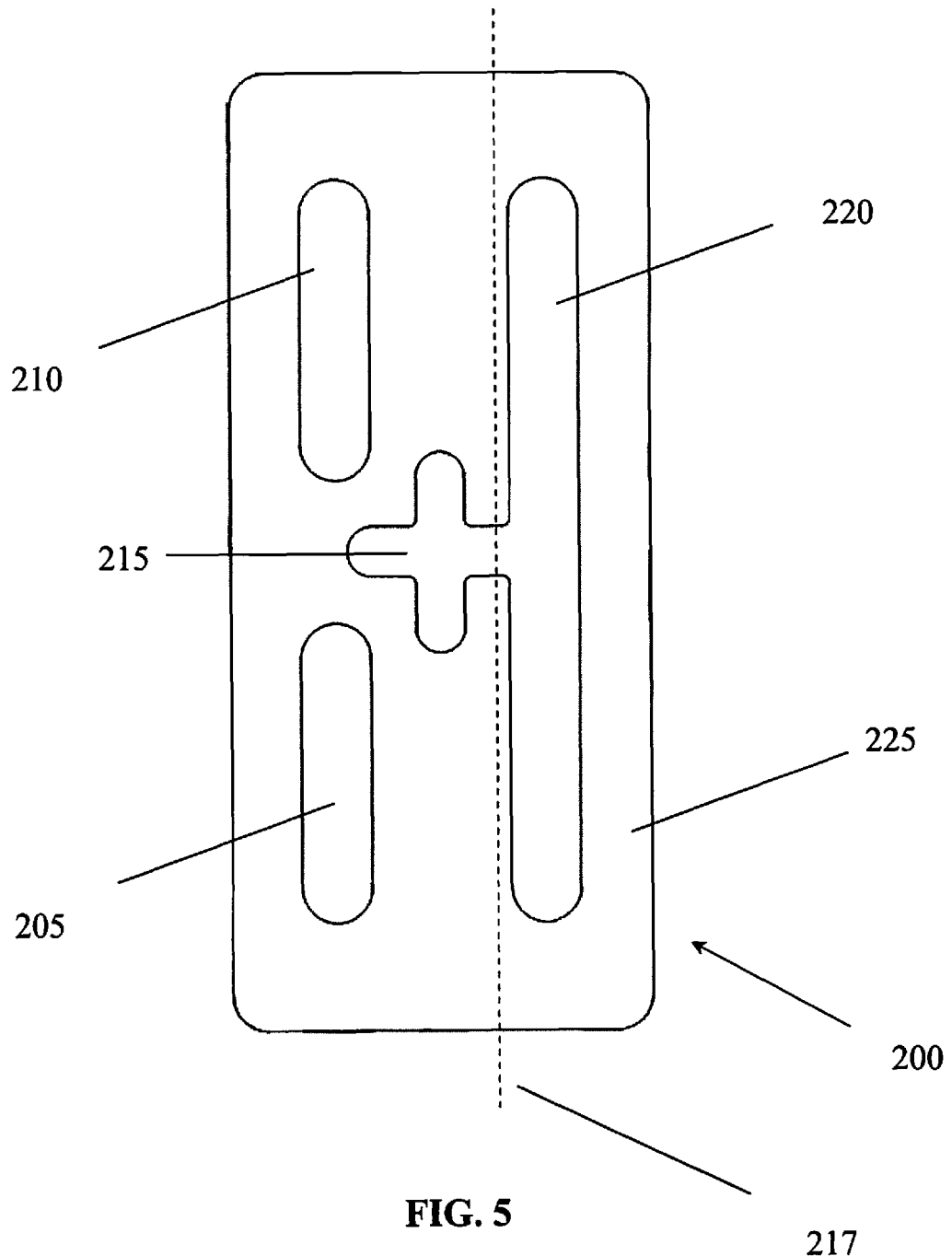
FIG. 5 illustrates a planar view of a fifth embodiment of a bracket.
Figure 6:
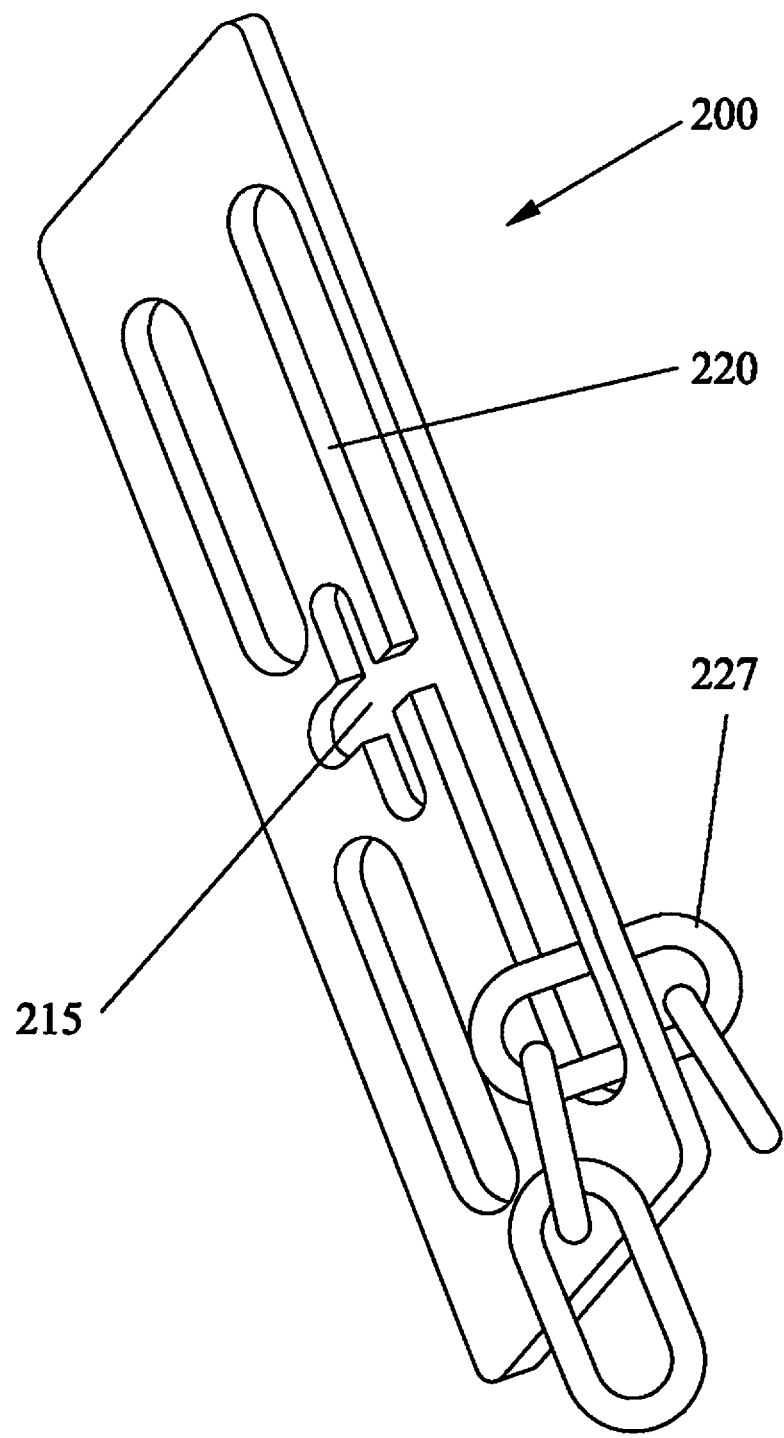
FIG. 6 illustrates a perspective view of the embodiment shown in FIG. 5, with a chain slidingly attached.

FIGS. 5 and 6 illustrate another embodiment of a bracket (200). In FIG. 5, the bracket (200) contains two apertures (205, 210), each of which have the same elongation. The variations in elongation allow for attachment of the bracket (200) to a variety of pre-existing cam-lock bushing plates. However, it is understood that this embodiment can be used for a gate assembly, or for attachment to the side of a trailer (rather than the door).

In the face of the bracket (200), a cross cut-out (215) allows for entry of a chain (227). As shown in FIG. 6, the bracket opening (215) communicates with the elongated slot (220), allowing one or more of the first links of the chain (227) to be passed through the cross cut-out (215) and the second or subsequent links to be slid into the elongated slot (220). When mounted to the planar surface in a manner such that the cross cut-out (215) abuts the surface, a first chain link is unable to return to the cross cut-out (215) trapping a subsequent link within the elongated slot (220) which can then slide freely along the elongated slot (220) adjacent the riding member (225), provided there is no constraining surface beneath the elongated slot (220). Alternatively, the bracket (200) can be fastened to a surface with a spacer between the surface and the plane containing the apertures (205, 210), so that there is no constraining surface beneath the elongated slot (220). Or, instead of a spacer, the bracket (200) may be optionally bent along the line (217), in order to form a flange having riding member (225), for attachment of the bracket to a semi-trailer.

It should be noted that when there is no constraining surface beneath the cross cut-out (215), the bracket (once fastened to the surface) then serves as a latch for the flexible member. In this case, the flexible member can be removed from the fastened surface by removing the links through the cross cut-out (215).

As in the embodiment shown in FIG. 2, the bracket (200) can be rotated 180 agrees, and applied to a surface. Alternatively, a mirror image of the bracket (200) can also be used.

Figure 7:
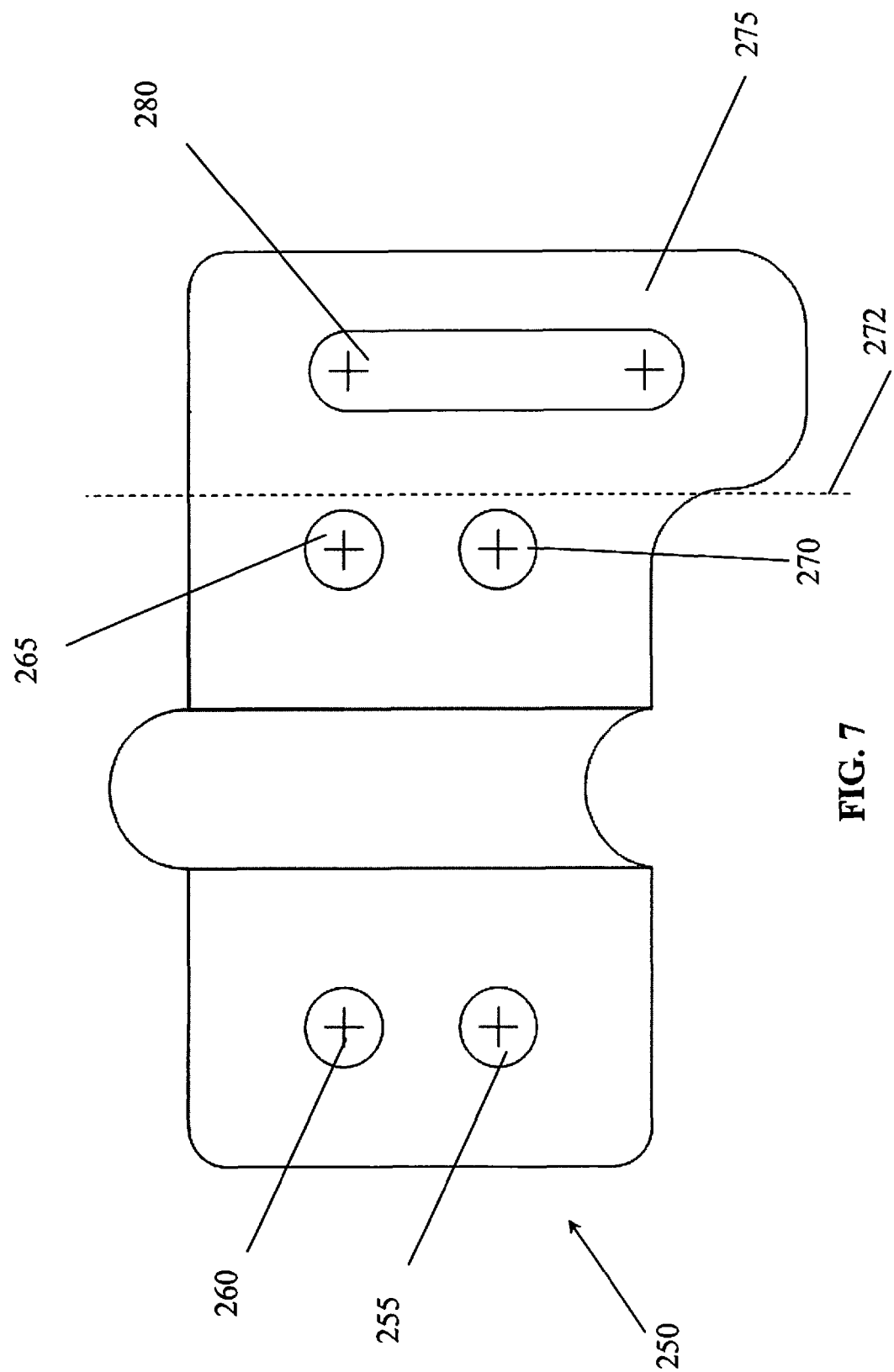
FIG. 7 illustrates a planar view of a sixth embodiment of a bracket.

FIG. 7 illustrates a planar view of an embodiment of a bracket (250) that forms part of a cam-lock bushing plate. This embodiment is for application to the door of a semi-trailer. The bracket (250) includes four apertures (255, 260, 265, 270) for use in mounting the bracket, similar to the four mounting points of a conventional cam-lock bushing plate (500) shown in FIG. 10. The riding member (275) is adjacent the elongated slot (280). However, in this embodiment, additional hardware (not shown) is needed to affix a chain link to the bracket (250), in the form of, for example, a clevis, a quick link, or similar type of intermediate attachment device between the bracket (250) and chain link. One end of the intermediate attachment device is attached to the riding member (275), while the other end is attached to a chain link. In addition, the bracket (250) is bent out of the aperture plane (along, for example, line 272), so that a flange having the riding member (275) is formed. This bracket (250) can be primarily attached using the orientation as shown. A mirror image of the bracket (250) would be used for the opposite door.

Figure 8:
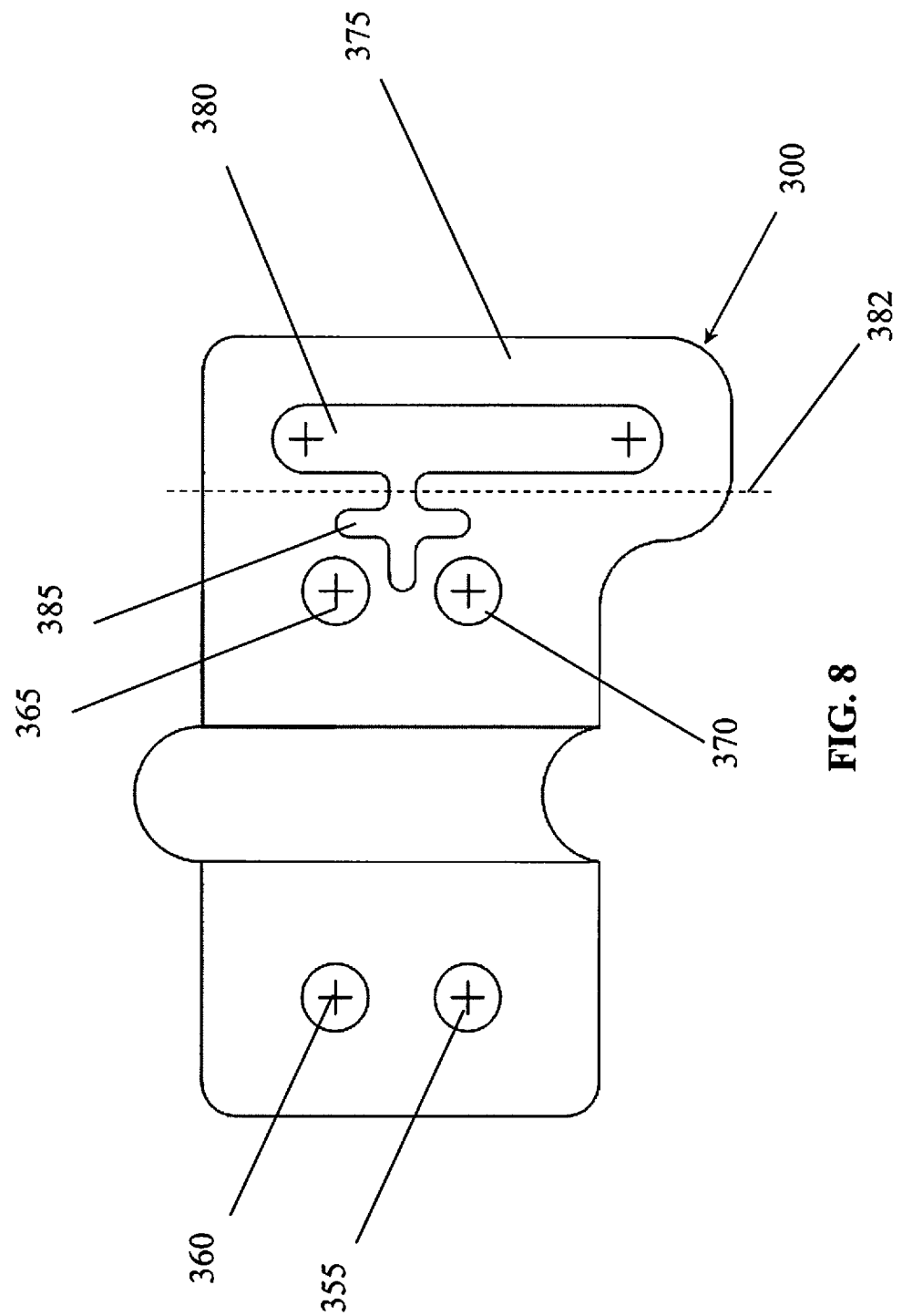
FIG. 8 illustrates a planar view of a seventh embodiment of a bracket.
Figure 10:
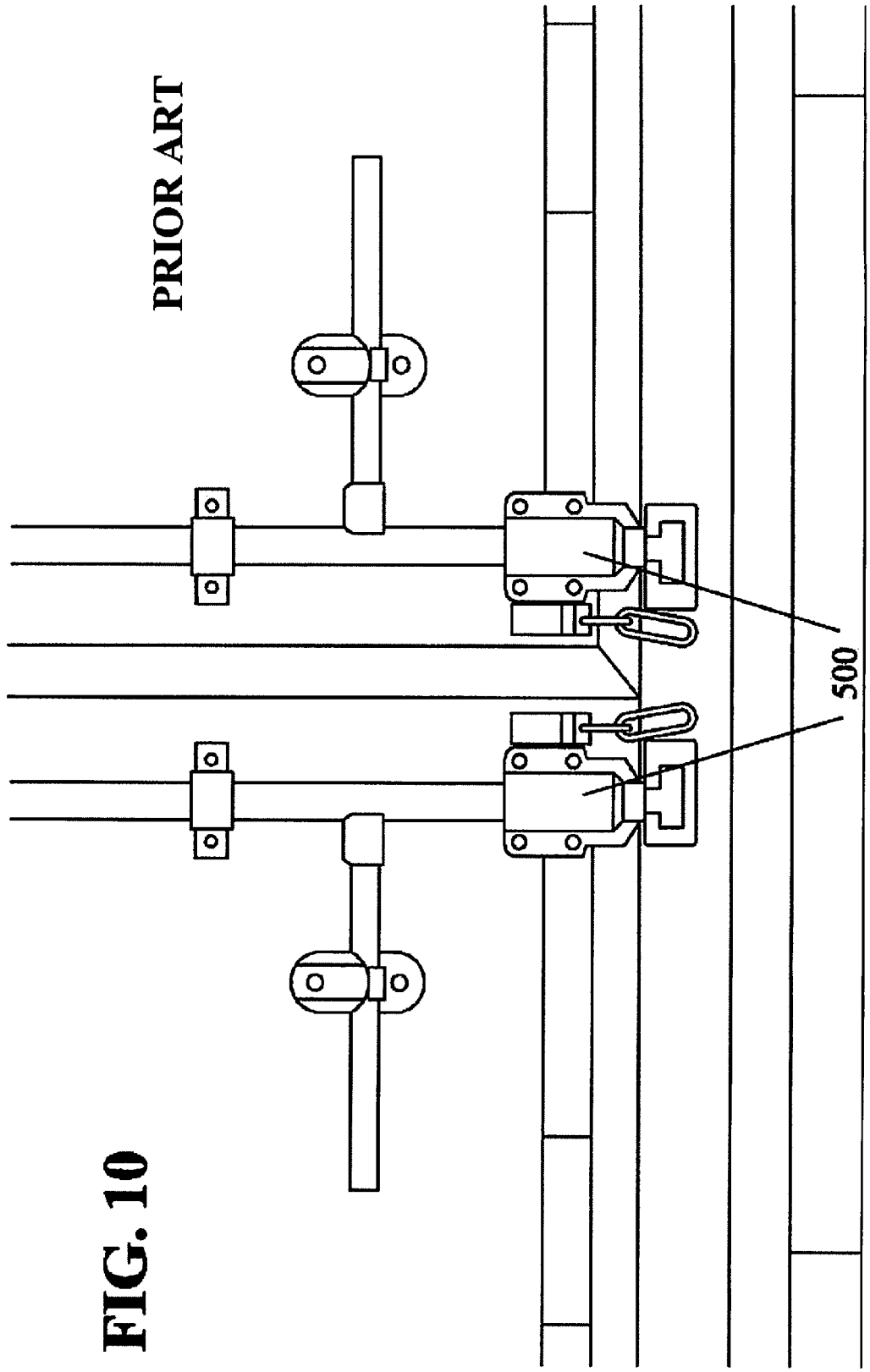
FIG. 10 shows a prior art example of a trailer door cam-lock assembly.

FIG. 8 illustrates a planar view of another embodiment of a bracket. (300) that forms part of a cam-lock bushing plate. As in FIG. 7, this embodiment is for application to the door of a trailer. The bracket (300) includes four apertures (355, 360, 365, 370) for use in mounting the bracket, similar to the four mounting points of a conventional cam-lock (500) as shown in FIG. 10. The riding member (375) is adjacent the elongated slot (380). However, in this embodiment, additional hardware is not required for the attachment of a chain link. The bracket opening (385), in the form of a cross-slot, allows for chain entry, without the need for additional hardware. In addition, the bracket (300) is bent out of the aperture plane (along, for example, line 382), so that a flange having the riding member (375) is formed. This bracket (300) can be primarily attached using the orientation shown. A mirror image of the bracket (300) would be used for the opposite door.

Figure 9A:
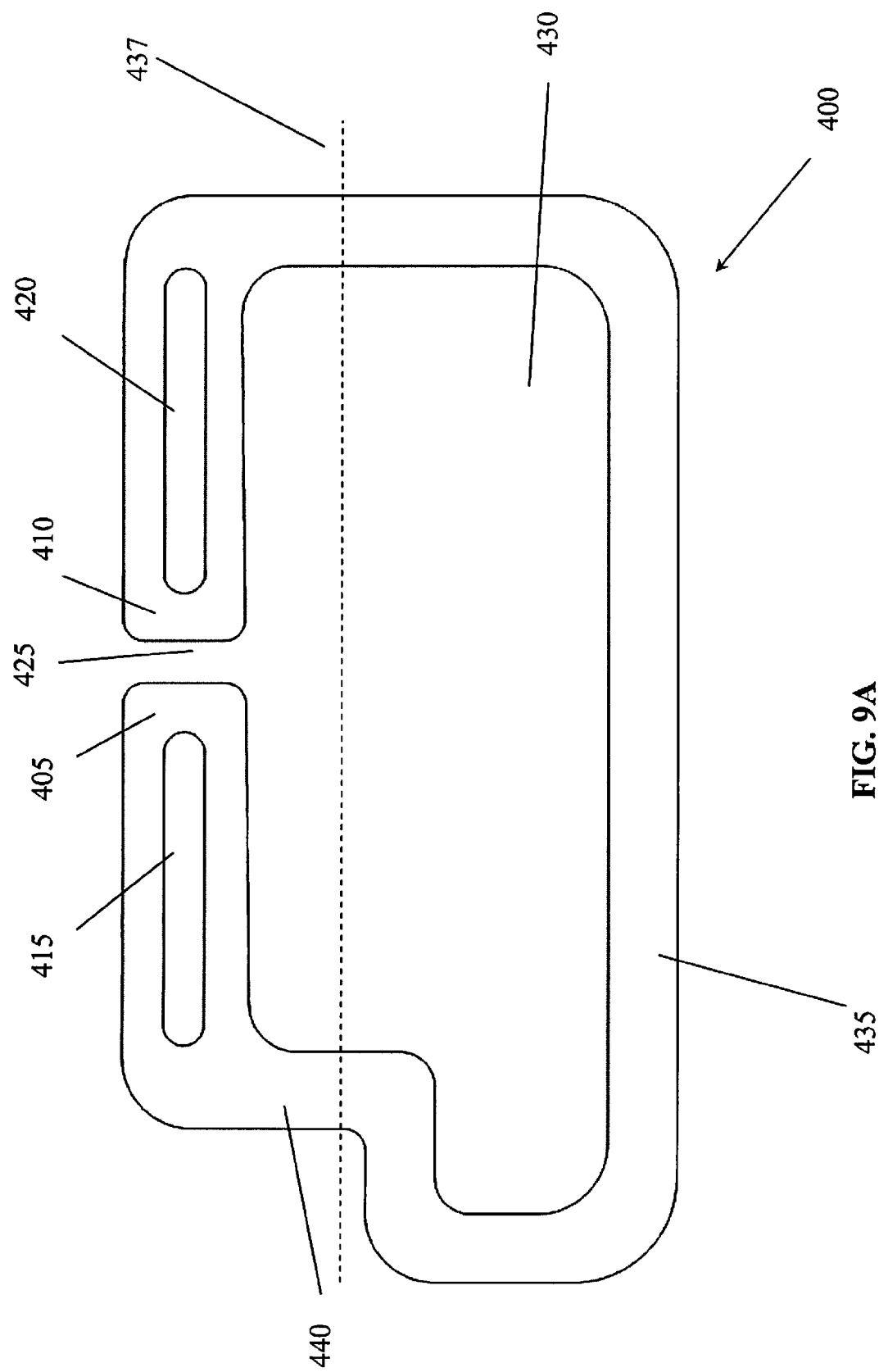
FIGS. 9A-9C illustrate a planar view of an eighth, ninth and tenth embodiment, respectively of a bracket.

FIG. 9A illustrates another embodiment of a bracket (400) made from a round stock/wire rod/tube. Two ends of the rod (405, 410) are stamped/forged, then machined to permit apertures (415, 420) for fastening. The rod is then bent along the same lines as a flat bracket, so that a bracket opening (425) is formed, which in turn, communicates with an elongated slot (430), which in turn, is adjacent a riding member (435). The key member (440) communicates with the riding member (435). As in other embodiments, an eye of a chain link slips over one end of the rod (405) (i.e. over the key member (440)), and slides to the elongated slot (430). The chain link is then free to slide along the riding member (435). The bracket (400) can be completely flat if there is no constraining surface beneath the elongated slot (430); otherwise, it is bent along line (437), for example, out of the aperture plane, so that a flange (having the riding member (435)) is formed. Alternatively, the bracket (400) can be fastened to a surface with a spacer between the surface and the plane containing the apertures (415, 420), so that there is no constraining surface beneath the elongated slot (430).

Figure 9B:
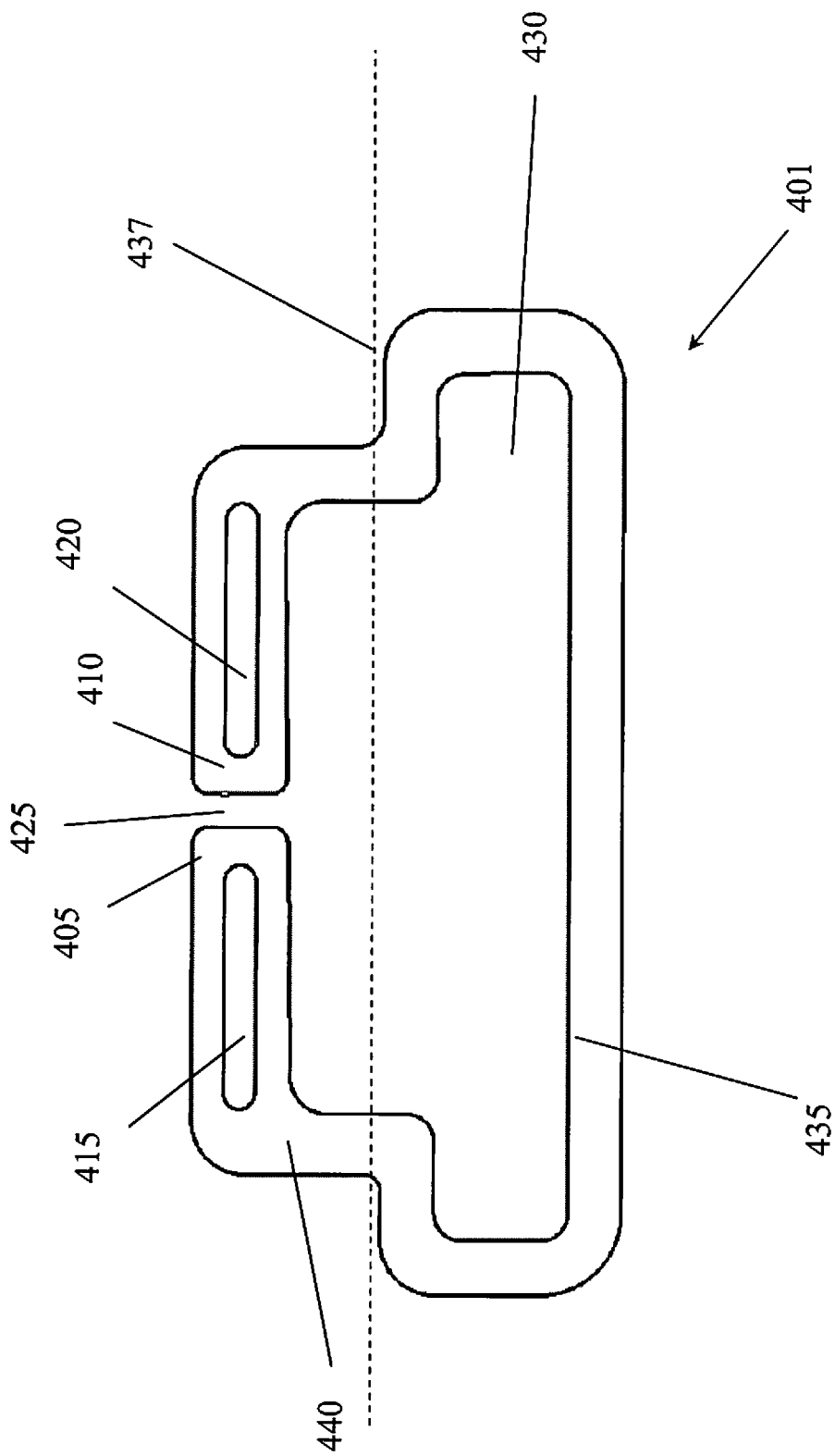
Figure 9C:
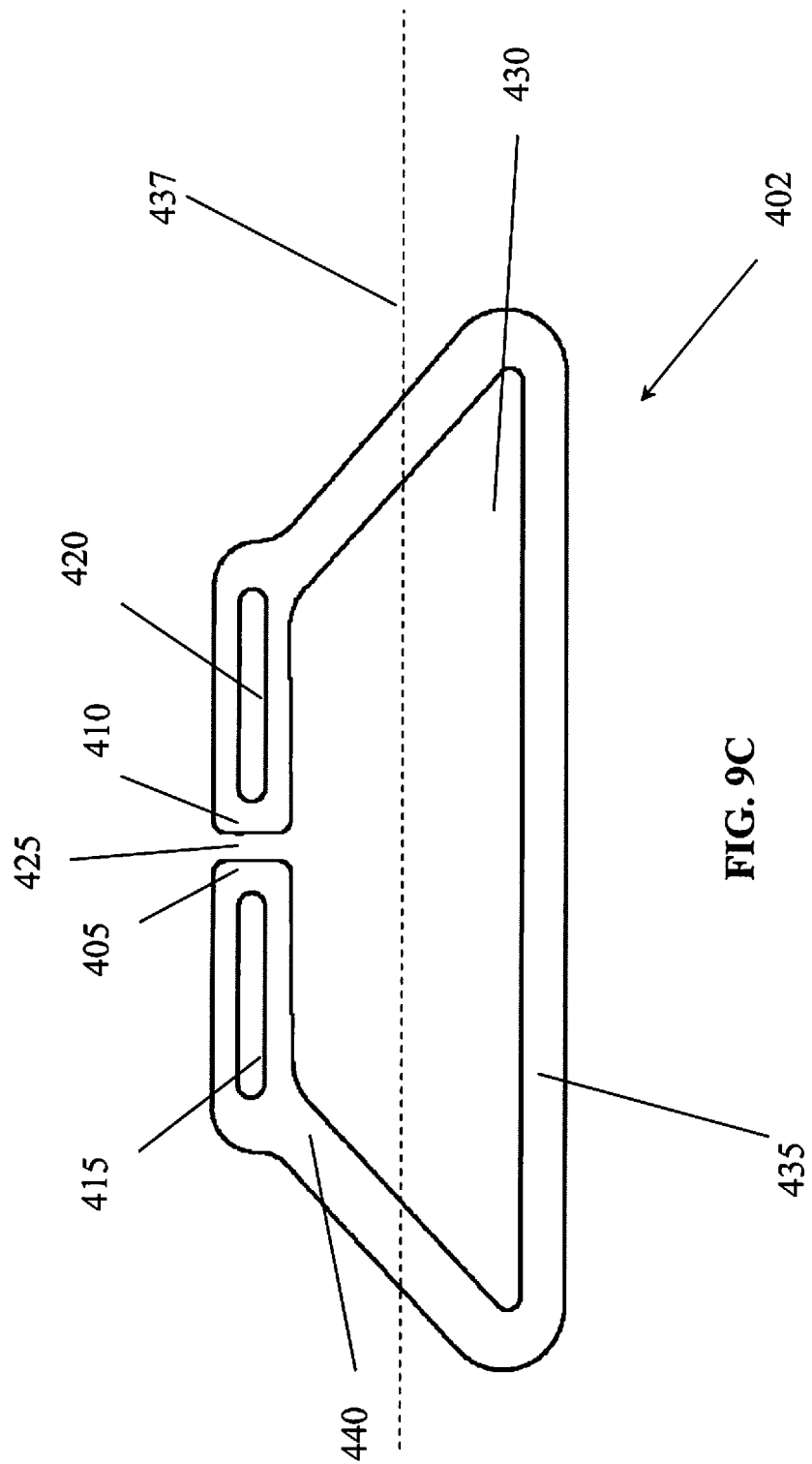

FIGS. 9B and 9C each illustrate a bracket (401) and (402), respectively, which are a variation of the embodiment shown in FIG. 9A. In FIGS. 9B and 9C, each bracket has a two-fold symmetry, and has a riding member (435) that is somewhat longer than that shown in FIG. 9A.

FIG. 10 shows two typical cam-lock bushing plates (500) on the back doors of a tractor-trailer. Each cam lock bushing plate (500) is mounted with four mounting bolts.

Application of embodiments shown in FIGS. 1, 2, 2A, 3, 4 and 9A-9C is as follows. First, a flexible member enters the bracket opening. The flexible member then slides, via a central opening of the flexible member, over the key member, to the elongated slot. The flexible member can then move freely along the length of the riding member. The bracket can have a portion that contains the riding member, bent out of the aperture plane. In all such embodiments, the largest diameter of an opening in the flexible member must be greater than the largest width of the key member, so that the flexible member can slide over the key member.

The assembled bracket and flexible member are then attached to a surface, after which the flexible member cannot access the opening of the bracket. It should be noted that there should be nothing impeding the flexible member from sliding along the riding member. To that end, if there is a constraining surface beneath the riding member, then the bracket can be attached to the surface with a spacer positioned between the two, thereby allowing for space between the riding member and the surface below.

In the case where the bracket is used for attachment to a semi-trailer, the bracket can have the flange design. The bracket can be attached, via the apertures, either to the door, or to the side of the trailer. When the bracket is attached to the door, it can be attached either directly to the door, or to the cam-lock bushing plate. In the latter case, the bracket is mounted using the two mounting bolts closest to the door edge. While the bracket can be mounted onto the other two bolts, such an arrangement reduces accessibility. The bracket-chain assembly is ready for use, with the chain having vertical mobility along the riding member of the bracket. The chain is adjusted to a desired height, and then attached to hardware on the side of the trailer.

Application of embodiments shown in FIGS. 4, 5 and 8 is as follows. First, the second or subsequent link of a flexible member enters the bracket opening (in FIG. 4) or cross cutout (in FIGS. 5 and 8). The flexible member then slides, into the elongated slot. The flexible member can then move freely along the length of the riding member, within the elongated slot. The bracket can have a portion that contains the riding member bent out of the aperture plane, while the portion of the bracket containing the aperture plane is affixed to a surface.

It should be noted that the bracket illustrated in FIG. 4 can be used in two ways. First, a large link can be inserted over the key member as in FIGS. 1, 2, 2A, 3 & 9A-9C, or the second or subsequent link of a chain can be passed through the entrance slot to the elongated slot, where it is trapped upon securing the bracket to the surface (as in FIGS. 5 and 8).

In the case where the bracket is used for attachment to a trailer, the bracket has the flange design. The embodiment of either FIG. 4 or 5, can be attached, via the apertures, either to the door, or to the side of the trailer. When the bracket is attached to the door, it can be attached either directly to the door, or to the cam-lock bushing plate. In the latter case, the bracket is mounted using the two mounting bolts closest to the door edge (but could be also be mounted using the two mounting bolts distal from the door edge). The embodiment of either FIG. 7 or 8 can be attached directly to the door, via the four apertures. The bracket-chain assembly is ready for use, with the chain having vertical mobility along the riding member of the bracket. The chain is adjusted to a desired height, and then attached to hardware on the side of the trailer.

CONCLUSION

The foregoing has constituted a description of specific embodiments showing how the bracket may be applied and put into use. These embodiments are only exemplary. The bracket in its broadest, and more specific aspects, is further described and defined in the claims which now follow.

These claims, and the language used therein, are to be understood in terms of the variants of the bracket which have been described. They are not to be restricted to such variants, but are to be read as covering the full scope of the bracket as is implicit within the disclosure that has been provided herein.

The invention claimed is:

1. A bracket for securing swing-able gates or doors in an open or closed position comprising:
   a) an elongated slot;
   b) a riding member adjacent the elongated slot;
   c) a bracket opening, which communicates with the elongated slot;
   d) a plurality of apertures for fastening the bracket to a surface, at least one of the plurality of apertures being on a first side of the bracket opening and at least one other of the plurality of apertures being on a second opposite side of the bracket opening such that when fastened to the surface the bracket opening is closed by the surface; and
   e) a key member for receiving a flexible member, the key member in communication with the riding member, wherein the flexible member attaches to the riding member; moves freely along a length of the riding member; and cannot access the bracket opening once the bracket is fastened to the surface.

2. The bracket of claim 1, wherein a number of the plurality of apertures is two.

3. The bracket of claim 1, wherein the plurality of apertures have an equal elongation length.

4. The bracket of claim 1, wherein a spacer is inserted between a portion of the bracket and the surface.

5. The bracket of claim 1, wherein a portion of the bracket is bent out of a plane containing the plurality of apertures, such that the riding member forms part of a flange.

6. The bracket of claim 5 wherein the bracket is attached to a cam-lock bushing plate or forms a cam-lock bushing plate.

7. The bracket of claim 1, wherein the flexible member is a chain link.

8. A bracket for securing swing-able gates or doors in an open or closed position comprising:
   a) an elongated slot with an adjacent riding member;
   b) a bracket opening for receiving a flexible member, the bracket opening in communication with the elongated opening; and
   c) a plurality of apertures for fastening the bracket to a surface, at least one of the plurality of apertures being on a first side of the bracket opening and at least one other of the plurality of apertures being on a second opposite side of the bracket opening such that when fastened to the surface the bracket opening is closed by the surface; wherein a flexible member is slidingly anchored to the bracket and moves freely along a length of the elongated slot.

9. The bracket of claim 8, wherein the bracket opening has a cross-shape.

10. The bracket of claim 8, wherein a number of the plurality of apertures is two.

11. The bracket of claim 8, wherein the plurality of apertures have an unequal elongation length.

12. The bracket of claim 8, wherein a spacer is inserted between a portion of the bracket and the surface.

13. The bracket of claim 5 wherein the bracket is attached to a cam-lock bushing plate or forms a cam-lock bushing plate.

14. The bracket of claim 13, wherein the bracket is attached to a cam-lock bushing plate.

15. The bracket of claim 13, wherein the bracket forms a cam-lock bushing plate.

16. The bracket of claim 8, wherein the flexible member is a chain link.

17. A bracket for formation of a cam-lock bushing plate for securing swing-able gates or doors in an open or closed position, the bracket comprising:
   a) an elongated slot;
   b) a riding member adjacent the elongated slot; and
   c) a plurality of apertures for fastening the bracket to a surface, at least one of the plurality of apertures being on a first side of a bracket opening and at least one other of the plurality of apertures being on a second opposite side of the bracket opening such that when fastened to the surface the bracket opening is closed by the surface; wherein the elongated slot and the riding member form part of a flange that is bent out of a plane containing the apertures.

18. The bracket of claim 17, wherein a flexible member is attached to the bracket via a linking member, the linking member is attached to the riding member, and the linking member is free to move along a length of the riding member.

19. The bracket of claim 17, wherein a number of the plurality of apertures is four.

20. The bracket of claim 18, wherein the flexible member is a chain link.

* * * * *